United States Patent
Herbig et al.

(10) Patent No.: US 8,346,551 B2
(45) Date of Patent: Jan. 1, 2013

(54) METHOD FOR ADAPTING A CODEBOOK FOR SPEECH RECOGNITION

(75) Inventors: Tobias Herbig, Ulm (DE); Franz Gerl, Neu-Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 561 days.

(21) Appl. No.: 12/622,717

(22) Filed: Nov. 20, 2009

(65) Prior Publication Data

US 2010/0138222 A1 Jun. 3, 2010

(30) Foreign Application Priority Data

Nov. 21, 2008 (EP) .................................... 08020323

(51) Int. Cl.
*G10L 15/06* (2006.01)
(52) U.S. Cl. ....................................................... 704/244
(58) Field of Classification Search ................... 704/244
See application file for complete search history.

(56) References Cited

U.S. PATENT DOCUMENTS

| | | | |
|---|---|---|---|
| 6,263,309 B1 * | 7/2001 | Nguyen et al. | 704/239 |
| 6,327,565 B1 * | 12/2001 | Kuhn et al. | 704/255 |
| 7,031,926 B2 * | 4/2006 | Makinen et al. | 704/500 |
| 8,131,544 B2 * | 3/2012 | Herbig et al. | 704/233 |

OTHER PUBLICATIONS

Botterweck, H. "Anisotropic MAP Defined by Eigenvoices for Large Vocabulary Continuous Speech Recognition," *IEEE*, vol. 1, May 7, 2001, pp. 353-356.
Sungjoo, A. et al. "Speaker Adaptations in Sparse Training Data for Improved Speaker Verification," *Electronic Letters*, vol. 36, No. 4, Feb. 17, 2000, pp. 371-372.
European Patent Office—European Search Report; Application No. 08020323.5-1224; Mar. 30, 2009.

* cited by examiner

*Primary Examiner* — Susan McFadden
(74) *Attorney, Agent, or Firm* — Sunstein Kann Murphy & Timbers LLP

(57) ABSTRACT

A method for adapting a codebook for speech recognition, wherein the codebook is from a set of codebooks comprising a speaker-independent codebook and at least one speaker dependent codebook. A speech input is received and a feature vector based on the received speech input is determined. For each of the Gaussian densities, a first mean vector is estimated using an expectation process and taking into account the determined feature vector. For each of the Gaussian densities, a second mean vector using an Eigenvoice adaptation is determined taking into account the determined feature vector. For each of the Gaussian densities, the mean vector is set to a convex combination of the first and the second mean vector. Thus, this process allows for adaptation during operation and does not require a lengthy training phase.

26 Claims, 4 Drawing Sheets

METHOD FOR ADAPTING A CODEBOOK FOR SPEECH RECOGNITION

PRIORITY

The present U.S. patent application claims priority from European Patent Application No 08020323.5 filed on Nov. 21, 2008 entitled Method for Adapting a Codebook for Speech Recognition, which is incorporated herein by reference in its entirety.

TECHNICAL FIELD

The present invention is directed to a method and an apparatus for adapting a codebook for speech recognition upon speech input. Speech recognition is used or intended to be used in many different areas such as dictation systems, hands-free telephony systems, speech controlled navigation systems, speech controlled mobile devices such as PDA's, transcription systems such as used in meetings, or speech controlled telephony services.

BACKGROUND ART

In most speech recognition systems, some kind of acoustical preprocessing of the speech input signal is performed to reduce distortions in the speech input due to ambient noise. The actual extraction of speech information is then performed using a statistical speech model. In many cases, hidden Markov models (HMM) are employed for these purposes. This hidden Markov models correspond to a Markov process of first order, the emission probabilities of which are modeled by a Gaussian mixture model (GMM). The parameters of the GMMs constitute the codebook of the speech recognizer.

Speaker independent speech recognizers work quite well in many cases. However, as there is no optimization to particular speakers, the recognition reliability is not always satisfactory.

Due to this, sometimes a speaker training is performed to adapt the speech recognizer to a particular person. Often, this is a supervised training in which the user undergoes a particular training phase. During this training phase, a given list of utterances is to be spoken. Via these training utterances, a speaker-dependent codebook is created. Such training, in general, significantly increases the recognition rate for a particular user.

Alternatively, an unsupervised adaptation method may be used. Here, a speaker does not undergo an explicit training phase; the system rather adapts the codebook using the speech input during use. Conventional unsupervised adaptation methods, however, have the drawback that a speaker change is not always correctly detected. Furthermore, they suffer under ambient noise which is usually present during use of the speech recognition system. In particular, there is always a risk that the statistical models employed are trained with respect to the acoustical environment and not with respect to the speaker characteristic.

SUMMARY OF THE INVENTION

The invention provides a method for adapting a codebook for speech recognition, wherein the codebook is from a set of codebooks comprising a speaker-independent codebook and at least one speaker-dependent codebook, each codebook being provided in form of a Gaussian mixture model (GMM) comprising a set of classes in form of multi-variate Gaussian densities, each multi-variate Gaussian density being parameterized by a mean vector and a co-variance matrix, comprising the steps of:

(a) receiving a speech input;
(b) determining a feature vector based on the received speech input;
(c) for each of the Gaussian densities, estimating a first mean vector using an expectation maximization process and taking into account the determined feature vector;
(d) for each of the Gaussian densities, estimating a second mean vector using an Eigenvoice adaptation and taking into account the determined feature vector; and
(e) for each of the Gaussian densities, setting its mean vector to a convex combination of the first and the second mean vector.

It turns out that adapting a speech recognition codebook (with respect to its mean vector) in the claimed way leads to a particularly reliable speech recognizer. Due to the use of the expectation maximization process, a training of the codebook during use is enabled. The use of the Eigenvoice adaptation allows for a fast adaptation at the same time. Thus, the claimed method does not require an extensive training phase before it is used but allows for an adaptation during operation.

A convex combination is a linear combination of points in an affine space (such as vectors) where all coefficients are non-negative and sum up to one. In the case of a convex combination of only two points, as in the present case, one of the coefficients may be denoted by $\alpha$, then, the other coefficient will be $1-\alpha$.

A feature vector is obtained by performing feature extraction on the speech input or utterance. Typically, a feature vector may be determined via a parameterization into the Mel-Cepstrum. For example, the power spectrum of an acoustic signal may be transformed into the Mel-Scale; for this purpose, for example, a Mel filterbank may be used. Then, the logarithm of the Mel frequency bands is taken, followed by a discrete cosine transform resulting in Mel frequency cepstral coefficients (MFCCs) constituting a feature vector. In general, there are also other possibilities to perform a feature extraction than by determining MFCCs.

In general, a speech input (or utterance) may be represented or results in a sequence of feature vectors; such a sequence may be obtained using overlapping windows.

Each codebook may be defined by the parameters of the respective GMM. The plurality of Gaussian densities of a GMM corresponds to the classes of the GMM.

In step (c), the determined feature vector may be assigned to the Gaussian densities or classes of the Gaussian mixture model via an a posteriori probability. Based on this assignment, the parameters of the Gaussian mixture model are re-determined. The steps of assigning and re-determining are repeated until a maximum likelihood is obtained.

For an Eigenvoice adaptation, the mean vectors of the Gaussian mixture model of a particular codebook are combined into a supervector. Based on this supervector, a covariance matrix with respect to the supervector is determined. A principal component analysis (PCA) of the covariance matrix yields the Eigenvoices from the Eigenvectors of the covariance matrix. For the Eigenvoice adaptation, only a predetermined number of the first or largest Eigenvectors may be used.

The second mean vector in step (d), taking into account the determined feature vector, is estimated by determining an adapted supervector given by a linear combination of the Eigenvoices and the mean vector of the speaker-independent codebook. The coefficients of this linear combination are obtained by maximizing a corresponding likelihood function.

In the above described methods, the expectation maximization process may be a maximum likelihood linear regression (MLLR) process or a Maximum a posteriori (MAP) process.

In the maximum likelihood linear regression process, the likelihood is maximized that the determined feature vector was emitted or created by a particular class of the Gaussian mixture model. The first step in a maximum a posteriori process corresponds to the maximum likelihood linear regression process. In the second step, a Bayesian estimation is performed using a prior distribution. In general, the coefficient $\alpha_i$ of the convex combination may be given by $$\alpha_i = \frac{(\mu_i^{EV} - \mu_i^{EM})^T \cdot \sum_{v_i}^{-1} \cdot (\mu_i^{EV} - \mu_i^{EM})}{(\mu_i^{EV} - \mu_i^{EM})^T \cdot \left(n_i \sum_i^{-1} + \sum_{v_i}^{-1}\right) \cdot (\mu_i^{EV} - \mu_i^{EM})},$$

wherein $n_i$ is the number of feature vectors assigned to class or Gaussian density i, $\Sigma_t$ is the covariance matrix of this Gaussian density, $\mu_i^{EV}$ is the mean vector of the Eigenvoice adaptation, $\mu_i^{EM}$ the mean vector of the expectation maximization process, $\Sigma_{v_i} = \Sigma_{\mu_i | \mu_i^{EV}}$ the conditional covariance matrix. In this case, the mean vector $\mu_i$ as set in step (e) will take the form $$\mu_i = \alpha_i \cdot \mu_i^{EV} + (1-\alpha_1) \cdot \mu_i^{EM} \quad 0 \leq \alpha_i \leq 1$$

The coefficient of the convex combination may be a function of the number of feature vectors assigned the respective Gaussian density. In particular, it may be a rational function, wherein the numerator is a constant and the denominator is a polynomial of first order with the number of assigned feature vectors as variable. The coefficient of the convex combination may be a function of the number of assigned feature vectors only. In particular, the coefficient may have the form $$\alpha_i = \frac{const.}{n_i + const.}.$$

The methods described above may further comprise the step of performing speech recognition on the speech input, wherein a confidence measure is determined with respect to the recognized speech, and wherein the coefficient of the convex combination is a function of the confidence measure.

The confidence measure is a measure for the reliability of the recognition. With regard to the speech input, a confidence measure may be determined for the speech input as a whole, or a confidence measure may be determined for each of the feature vectors corresponding to the speech input. Such a dependency of the coefficient of the convex combination on a confidence measure allows to take into account feature vectors that have been recognized with high reliability to a larger degree and/or to reduce the influence of feature vectors, the recognition reliability of which is small.

In particular, the coefficient of the convex combination may be a function of the product of the number of feature vectors assigned to the respective Gaussian density and the confidence measure. More specifically, the function may be a rational function as specified above.

The invention also provides a method for identifying or recognizing a speaker based on a set of speech recognition codebooks comprising a speaker-independent codebook and at least one speaker-dependent codebook, the method comprising the steps of receiving a speech input, determining a feature vector based on the received speech input, identifying or selecting a codebook based on the determined feature vector according to a predetermined criterion. In particular, the set of codebooks may comprise a plurality of speaker-dependent codebooks. The method may further comprise identifying a speaker corresponding to the identified or selected codebook.

In particular, in the previously described methods, steps (c)-(e) may be preceded by the step of selecting the codebook from the set of codebooks according to a predetermined criterion.

The selecting step may comprise identifying a speaker corresponding to the speech input and identifying or selecting the codebook corresponding to the identified speaker. By using speaker-dependent codebooks in this way, both the adaptation of the codebook and the speech recognition is improved. Furthermore, this allows the recognition of the speaker.

Identifying a speaker may be performed in different ways. According to one alternative, a speaker identification may be based on external sources. For example, a speaker may identify him or herself explicitly. According to another alternative, speaker identification is based on the received speech input and the set of codebooks. Although, in principle, these alternative may be combined, in particular, speaker identification may be based on the received speech input and the set of codebooks only.

The step of identifying or selecting the codebook may comprise creating a new speaker-dependent codebook if the speaker corresponding to the speech input is not identified or if the set of codebooks does not contain a codebook corresponding to the identified speaker. In particular, creating a new speaker-dependent codebook may be based on the speaker-independent codebook and the received speech input, for example, by adapting the speaker-independent codebook using an expectation maximization process and/or an Eigenvoice adaptation, in particular, according to steps (c)-(e) as outlined above.

The steps of the described methods may be preceded by providing a set of Eigenvoices based on a predetermined data set, in particular, a predetermined set of speaker-dependent codebooks. The predetermined set of speaker-dependent codebooks may be obtained using the speaker-independent codebook and, in particular, using a training with a predetermined set of speakers. The step of providing the set of Eigenvoices may comprise performing a principal component analysis (PCA) based the set of speaker-dependent codebooks.

In the preceding methods, the step of identifying or selecting the codebook may comprise determining a score for assigning a sequence of feature vectors to each of the codebooks, and identifying or selecting the codebook based on the determined scores.

Such a score is a likelihood that the sequence of feature vectors was emitted by the respective codebook. The sequence of feature vectors may be a part of or all the feature vectors corresponding to the speech input. The score may be smoothed using a first order recursion. Thus, by identifying or selecting the codebook via such a score, the most appropriate codebook will always be used. In particular, the codebook may be selected for which the value or the absolute value of the score is extremal, particularly, maximal. In other words, the codebook with the highest (maximal) or lowest (minimal) score may be selected.

a score may be determined by selecting the classes from the speaker-independent codebook to which a number of feature vectors above a predetermined threshold is assigned. Then selecting the classes from the at least one speaker-dependent codebook that correspond to the selected classes from the speaker-independent codebook. Based upon the selected classes, determining a score for each of the codebooks.

By selecting only those classes containing at least a predetermined minimum number of feature vectors (or to which a minimum number of feature vectors is assigned), only dominant classes in the Gaussian mixture model are taken into account. In this way, the computations are simplified while maintaining a high degree of reliability.

The previously described methods may comprise the step of creating a new speaker-dependent codebook if the step of identifying or selecting the codebook based on the determined score yields or would yield the speaker-independent codebook. For example, a new speaker-dependent codebook may be created if the speaker-independent codebook is the codebook with the extremal, e.g. maximal, score. This is a simple criterion to determine whether the speaker is already known or whether a new speaker is present. In addition or alternatively, other sources may be used to determine whether a new speaker-dependent codebook is to be created. The newly created codebook may then be selected for steps (c) to (e).

In the previously described methods, the identifying or selecting step may be performed using a Viterbi process. In particular, a Viterbi algorithm may be applied to a sequence of feature vectors and/or speech inputs or utterances; in this way, an optimal path according to the Viterbi algorithm may be determined.

In the above-described methods, step (b) may comprise processing the feature vector to reduce distortions to obtain a corrected feature vector. This allows for the reduction of noise components that are present in the feature vector so that a corrected feature vector is obtained.

In particular, the processing step may be based on a conditional Gaussian mixture model obtained via a minimum mean square error (MMSE) estimate. The conditional Gaussian mixture model models the corrected feature vector under the condition of a known distorted feature vector. The Gaussian mixture model is determined or trained using an expectation maximization algorithm.

In the above methods, step (b) may be preceded by processing the received speech input to reduce distortions, in particular, noise components. Specifically, a speech signal enhancements (SSE) may be performed. For example, a noise reduction via a Wiener filter may be performed.

The described methods may be computer-implemented. In particular, the steps may be performed automatically. The invention further provides a computer program product comprising at least one computer-readable medium having computer-executable instructions to cause a computer to perform the steps of the above-described methods when run on a computer.

The invention also provides an apparatus for adapting a codebook for speech recognition, wherein the codebook is from a set of codebooks comprising a speaker-independent codebook and at least one speaker-dependent codebook, each codebook being provided in form of a Gaussian mixture model comprising a set of classes in form of multivariate Gaussian densities, each multivariate Gaussian density being parameterized by a mean vector and covariance matrix. The adaptations for the codebook are determined in response to receiving a speech input at a receiver. The receiver provides the speech signal to a feature vector module for determining a feature vector based on the received speech input. The determined feature vector is provided to an estimation module that estimates for each of the Gaussian densities, a first mean vector using an expectation maximization process and taking into account the determined feature vector. The apparatus also include a second estimation module for estimating for each of the Gaussian densities, a second mean vector using an Eigenvoice adaptation and taking into account the determined feature vector. The output of the two estimation module i.e. the first and second mean vectors is used by an adaptor module for setting, for each of the Gaussian densities, its mean vector to a convex combination of the first and the second mean vector.

The apparatus may be further configured analogously to the case of the above-described methods. For example, the first estimation module may be configured to estimate the first mean vector using a maximum likelihood linear regression process or a maximum a posteriori process. As another example, the apparatus may comprise a selection module for selecting the codebook from a set of codebooks according to a predetermined criterion. Furthermore, the apparatus may comprise a codebook creation module for creating a new speaker-dependent codebook if the codebook with the highest score is the speaker-independent codebook.

The invention also provides an apparatus for identifying or recognizing a speaker based on a set of speech recognition codebooks comprising a speaker-independent codebook and at least one speaker-dependent codebook, the apparatus includes a receiver for receiving a speech input, a feature vector selection module for selecting a feature vector based on the received speech input, and a codebook selector for selecting a codebook based on the determined feature vector according to a predetermined criterion.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
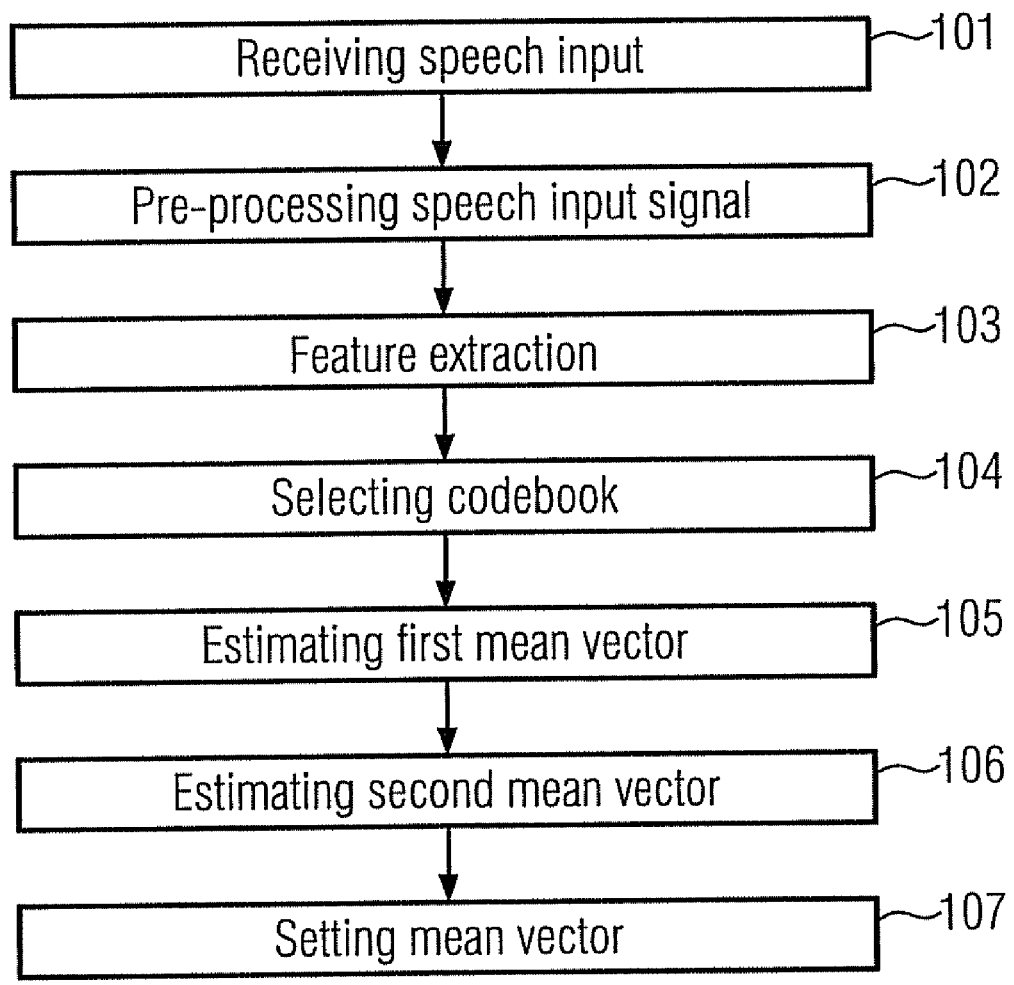
FIG. 1 illustrates a flow diagram of an example of a method for adapting a codebook.

FIG. 1 shows a flow diagram of an example of a method for adapting a codebook for speech recognition. The steps of this method in general will be performed in an automated way using a computing system, in particular, a digital signal processor. A corresponding apparatus or system for performing the method may be provided, for example, in a vehicular cabin to be used for a hands-free telephony system or a speech controlled navigation device; as a further possibility, for example, the method may be implemented in a personal digital assistant (PDA) to provide a speech control of the mobile device. Other fields of application are possible as well.

In a first step 101, a speech input or utterance is received. Typically, the speech input is received by one or more microphones yielding a speech input signal. The microphone may be directional microphones or may be arranged in a microphone array for a beamformer. Alternatively, it is also possible to use one or more conventional omni-directional microphones.

The speech input signal is then pre-processed. This pre-processing may serve for different purposes. It is to be understood that the different pre-processing steps described in the following, to a large extent, are optional and need not be present at the same time.

Figure 2:
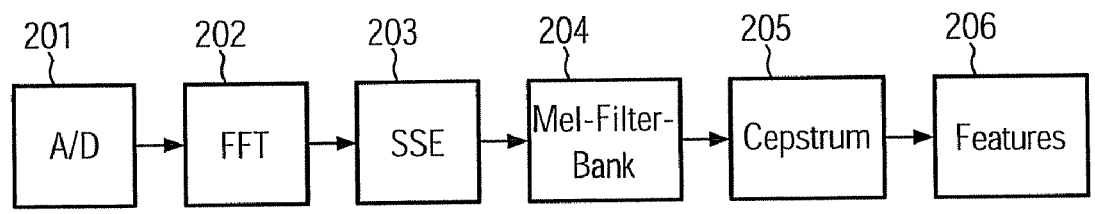
FIG. 2 illustrates an example to obtain a feature vector.

Examples for different pre-processing stages are illustrated schematically in FIG. 2. In general, the speech input signal coming from the microphones is an analog signal. In view of this, the signal is converted to a digital signal using an analog/digital converter 201. Here, the signal is sampled and quantized.

After that, the signal is transformed from the time domain to the frequency domain in stage 202. For this purpose, a fast Fourier transform (FFT) or a short time Fourier transform (STFT), wherein the time signal is divided into overlapping windows, is performed. Alternatively, a wavelet transform may be performed as well.

In a further stage 203, a noise reduction is performed. Such a speech signal enhancement (SSE) may use Wiener filters to estimate the undistorted power spectrum of the speech signal.

Returning to FIG. 1, after the pre-processing step, a feature vector is extracted in step 103. An example for such a feature extraction is given by stages 204-206 in FIG. 2.

According to this example, a Mel-Frequency Cepstrum (MFC) is obtained. For this purpose, a Mel filterbank is used to perform a logarithmic frequency distortion of the power spectrum of the speech signal, and the energies of neighboring frequency bands are combined. In this way, a mapping onto the Mel-scale is achieved.

Then, in stage 205, the logarithm of the powers in each of the Mel-Frequency bands is taken and a discrete cosine transform (DCT) is performed resulting in Mel-Frequency Cepstral Coefficients (MFCCs). These are identified with the feature vectors $x_t$ in stage 206 with time index t and dimension d.

In general, particularly when using a short time Fourier transform, an utterance or speech input signal will result in a sequence of feature vectors $X=(x_1, K, x_t, K, x_T)$.

Other methods of feature extraction such as perceptual linear prediction (PLP) may be used as well.

Based on such a feature vector $x_t$, a codebook for speech recognition is adapted in the following steps. For this purpose, a set of codebooks is present, this set of codebooks comprising a speaker-independent codebook and at least one speaker-dependent codebook. From this set of codebooks, one of the codebooks is selected in step 104 for adaptation. As will be outlined in detail in the following, based on the determined feature vector, a first mean vector using an expectation maximization process is determined for this codebook in step 105. Similarly, taking into account the determined feature vector, a second mean vector is determined for the codebook in step 106, now using an Eigenvoice adaptation. These mean vectors are then combined via a convex combination to obtain a new mean vector for the codebook in step 107, thus, adapting the codebook (via assignment of the new mean vector) to the determined feature vector.

Each of the codebooks has the form of a Gaussian mixture model. In other words, the parameters of a Gaussian mixture model define a codebook.

In general, a Gaussian mixture model consists of a linear combination of N multivariate Gaussian densities which are also called classes with index i. Each Gaussian density is defined or parameterized by its mean vector $\mu_i$ and the covariance matrix $\Sigma_i \cdot \Lambda_i = (\mu_i, \Sigma_i)$ is the parameter set of the class i. When forming a linear combination of the classes, an additional weighting of the classes according to their proportions with respect to the overall probability density is performed.

Respective weights $w_i$ of the different classes may be interpreted as a posteriori probabilities of the classes:

$$\sum_{i=1}^{N} w_i = 1.$$

These weights represent the relative frequency of the training data (feature vectors) that are used when modeling the respective Gaussian density. $\Theta = \{w_1, \Lambda_1, \ldots, w_N, \Lambda_N\}$ denotes the parameter set of the GMMs. The likelihood for a feature vector $x_t$ is $$p(x_t \mid \Theta) = \sum_{i=1}^{N} w_i \cdot N_i \left\{ x_t \mid \mu_i, \sum_i \right\},$$

wherein $N_i\{.\}$ is the normal distribution or Gaussian density. The training of a GMM, in principle, is performed via an expectation maximization algorithm (EM algorithm), see A. Dempster et al., *Maximum Likelihood From Incomplete Data via the EM Algorithm*, Journal of the Royal Statistical Society, Series B, 39(1):138, 1977 or F. Dellaert, *The Expectation Maximization Algorithm*, Tutorial, http://www.cc.gatech.edu/~dellaert/em-paper.pdf, 2002. Alternatively, a K-means process may be used. Each of these papers is incorporated herein by reference in their entirety.

Starting from an initial model or parameter set $\Theta_0$, in an E-step, the feature vectors $x_t$ are assigned to the classes of the model via a posteriori probability $p(i|x_t,\Theta)$. Based on this assignment, in an M-step, a redetermination or recalculation of the model parameters is performed to obtain the parameter set $\Theta_1$. These two steps are repeated iteratively until the above likelihood is maximal (see also D. A. Reynolds et al., "Robust text-independent speaker identification using Gaussian mixture speaker models", IEEE Transactions on Speech and Audio Processing, Vol. 3, No. 1, 1995), which is incorporated herein by reference in its entirety.

These steps of an expectation maximization process may be performed in different ways. A first possibility is a maximum likelihood linear regression (MLLR) process (M. J. F. Gales, P. C. Woodland, *Mean and Variance Adaptation within the MLLR Framework*, 1986), which is incorporated herein by reference in its entirety.

In this case, one has a latent variable due to an unknown assignment to a class of a GMM. Under the assumption that a feature vector $x_t$ was emitted or created by a GMM with parameter set $\Theta$, the latent variable is the uncertainty which of the classes actually emitted this feature vector. In the following, the class index i will be interpreted as the latent variable.

In the E-step, an estimation of the latent variable i is performed for all "training data" $x_t$ starting from an initial model $\overline{\Theta}$. Thus, the affiliation of the feature vector to a class is estimated via the a posteriori probability $p(i|x_t, \Theta)$. In the second step, the M-step, a new determination of the model parameters $\Theta$ is performed so that the likelihood function takes a maximum. This recalculation of the model parameter with maximum likelihood is obtained by maximizing the following auxiliary function:

$$Q_{EM}(\Theta, \overline{\Theta}) = \sum_t \sum_{i=1}^{N} p(i \mid x_t, \overline{\Theta}) \cdot \log(p(x_t, i \mid \Theta))$$

These two steps are repeated until the likelihood function $p(x_t|\Theta)$ takes a maximum. The resulting estimate will be denoted by $\Theta^{EM}$ or via $\mu^{EM}$. In most cases, the initial model $\Theta_0$ is initialized randomly.

In general, the maximum likelihood is particularly suitable for large data sets.

Another possibility is the maximum a posteriori (MAP) process (see also J.-L. Gauvain et al., *Maximum A Posteriori Estimation for Multivariate Gaussian Mixture Observations for Markov Chains*, IEEE Trans. on Speech and Audio, 1994), which is incorporated herein by reference in its entirety. In this case, the above-mentioned auxiliary function is augmented by an additive component integrating prior knowledge about the model parameters:

$$Q_{MAP}(\Theta, \overline{\Theta}) = \sum_t \sum_{i=1}^{N} p(i \mid x_t, \overline{\Theta}) \cdot \log(p(x_t, i \mid \Theta)) + \log(p(\Theta))$$

$$Q_{MAP}(\Theta, \overline{\Theta}) = Q_{EM}(\Theta, \overline{\Theta}) + \log(p(\Theta))$$

In this equation, one has a continuous transition from log $p(\Theta)$ to $Q_{EM}(\Theta, \overline{\Theta})$ with increasing number of training data $n_i = \Sigma p(i|x_t, \Theta)$.:

$$Q_{MAP}(\Theta, \overline{\Theta}) \to \log p(\Theta) \text{ for } n_i \to 0$$

$$Q_{MAP}(\Theta, \overline{\Theta}) \to Q_{EM}(\Theta, \overline{\Theta}) \text{ for } n_i \to \infty$$

If one assumes that the classes are statistically independent, the optimization of the auxiliary function $Q_{MAP}(\Theta, \overline{\Theta})$ may be performed for each class independently of the other classes:

$$Q_{MAP}(\Theta, \overline{\Theta}) = Q_{EM}(\Theta, \overline{\Theta}) + \sum_{i=1}^{N} \log(p(\Lambda_i))$$

In this way, the reliability of adaptation parameters is evaluated class-wise. If sufficiently many data are assigned to a particular class, the expectation maximization (maximum likelihood) estimate, $\Lambda_{EM,i}$ will be taken for class i. If the amount of data is small, $\Lambda_{EM,i}$ is rejected and the prior knowledge $p(\Lambda_i)$ is maintained. The resulting estimate will be denoted by a superscript index MAP.

Also in the case of an MAP process, this method is particularly suitable if a large set of utterances of a speaker is available to obtain a robust model.

Figure 3:
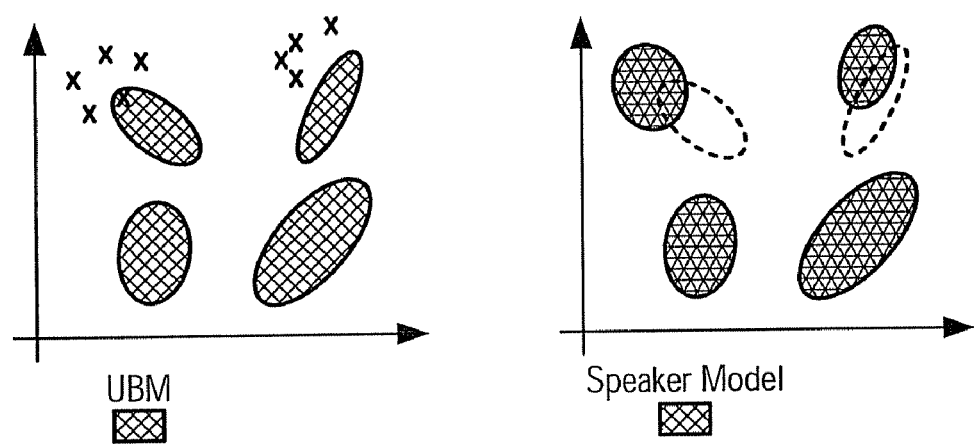
FIG. 3 illustrates an example of a MAP adaptation.

When using the MAP method for adapting a codebook to a particular speaker, only one iteration step will be performed using the above equation for $Q_{MAP}$. In a first step, the a posteriori probability $p(i|x_t, \Theta)$ is determined. This corresponds to the probability that a feature vector $x_t$ was generated at time t by the class with index i having knowledge of the parameter $\Theta$ of the Gaussian mixture model. In other words, this corresponds to a soft assignment of a feature vector to the classes of the GMMs that are then adapted in a next step. This is schematically illustrated in FIG. 3.

In the second step, the relative frequencies $\hat{w}_i$ of the feature vectors in these classes are determined as well as their mean vectors $\hat{\mu}_i$ and covariance matrices $\hat{\Sigma}_i$. These values are used in the last step for updating the GMM parameters. $n_i$ denotes the absolute number of vectors that are "softly" assigned to class i.

In the following, only the mean vectors of the GMMs are adapted. In principle, the covariance matrices could be adapted as well (see, for example, D. A. Reynolds et al., "Speaker Verification Using Adapted Gaussian Mixture Models", Digital Signal Processing, 10, 19-41, 2000), which is incorporated herein by reference in its entirety. The adapted parameters are as follows:

$$p(i \mid x_t, \Theta) = \frac{w_i \cdot N\{x_t \mid \mu_i, \Sigma_i\}}{\sum_{i=1}^{N} w_i \cdot N\{x_t \mid \mu_i, \Sigma_i\}}$$

$$n_i = \sum_{t=1}^{T} p(i \mid x_t, \Theta)$$

$$\hat{w}_i = \frac{n_i}{T}$$

$$\hat{\mu}_i = \frac{1}{n_i} \sum_{t=1}^{T} p(i \mid x_t, \Theta) \cdot x_t$$

The new GMM parameters $\overline{\mu}$ and $\overline{w}$ are determined as a combination of the previous GMM parameters $\mu$ and w and the updates $\hat{\mu}$ and $\hat{w}$ (as illustrated in FIG. 3). After determining the updates $\hat{\mu}$ and $\hat{w}$, a weighted mean or average is determined using the previous values. The previous values are weighted with the factor $1-\alpha_i$, the updates are weighted with the factor $\alpha_i$, and the sum is determined:

$$\alpha_i = \frac{n_i}{n_i + const.}$$

$$\overline{\mu}_i = \mu_i \cdot (1 - \alpha_i) + \hat{\mu}_i \cdot \alpha_i$$

$$\overline{w}_i = \frac{w_i \cdot (1 - \alpha_i) + \hat{w}_i \cdot \alpha_i}{\sum_{i=1}^{N} (w_i \cdot (1 - \alpha_i) + \hat{w}_i \cdot \alpha_i)}$$

Performing a convex combination using the vector $\alpha_i$, a weighting via the number of softly assigned feature vectors is performed so that the adaptation step is proportional to the number of incoming vectors. Classes with less adaptation data are adapted more slowly than classes for which a large number of vectors are used for the update. The factor $\alpha_i$ need not be the same for the weights and means within a specific cluster. Furthermore, it has to be assured that the sum of the weights is equal to one. Thus, the weighted sum of old parameters and maximum likelihood parameters reflects the reliability regarding the rating of the data.

The above described expectation maximization, i.e. MAP, process is used to estimate the first mean vector for an adapted Gaussian mixture model. In other words, $\mu_i^{EM} = \overline{\mu}_i$.

The second mean vector is determined using an Eigenvoice adaptation, as will be described in the following (see also R. Kuhn, et al., *Eigenvoices for Speaker Adaptation*, Proc. of Intl. Conf. On Spoken Language Processing, pp. 1771-1774, 1998 or Hansen et al., *Rapid Discriminative Acoustic Model based on Eigenspace Mapping for fast Speaker Adaptation*, IEEE Trans. on Speech and Audio Processing, vol. 13, no. 4, pp. 554-564, 2005), both of which are incorporated herein by reference in its entirety.

For performing an Eigenvoice adaptation, it is particularly useful to have a plurality of speaker-dependent codebooks.

Speaker-dependent codebooks are described in EP 1 022 725, U.S. Pat. No. 6,766,295, EP 1 610 302 or A. Park et al., *ASR Dependent Techniques for Speaker Identification*, Proc. Acoustics, Speech and Signal Processing, ICASSP 2001, which are incorporated herein by reference in their entirety.

When performing an Eigenvoice adaptation for a given set of speaker-dependent codebooks, the principal components (Eigenvoices) are extracted. During later use of the system, the adapted parameters are given as linear combinations of these principal components. In general, the principal component analysis is performed beforehand using a predetermined set of speaker-dependent codebooks which is obtained via a training starting from the speaker-independent codebook. These speaker-dependent codebooks were trained in advance (offline) using a set of speakers which, in principle, do not correspond to the users of the present system.

More specifically, for a set of speakers j, j=1, ..., N, we have mean vectors $\mu_i^j$, wherein j=0 corresponds to the speaker-independent mean vector. Thus, when creating the speaker-dependent codebooks starting from the speaker-independent codebook using an adaptation via a MAP process, one has a set of trained speaker-dependent models as follows $$\mu_i^0 \xrightarrow{MAP} \{\mu_i^1, \ldots, \mu_i^N\} \quad \forall i$$

It is assumed that the mean value over all speakers corresponds to the mean value over all training data. The mean vector of each speaker combined to a supervector $\tilde{\mu}^j = ((\mu_1^j)^T, K, (\mu_N^j)^T)^T$, wherein T denotes the transposed. The further calculations and computations are performed using these supervectors, wherein $$E_j\{\tilde{\mu}_i^j\} = \tilde{\mu}_i^0$$

In order to determine the principal components, the covariance matrix $\tilde{E}$ with respect to the supervectors is determined:

$$\tilde{\Sigma} = E_j\{(\tilde{\mu}^j - \tilde{\mu}^0) \cdot (\tilde{\mu}^j - \tilde{\mu}^0)^T\}.$$

Via a principal component analysis, the principal components or Eigenvoices $\tilde{\mu}^l$ of the Eigenvectors of the covariance matrix $\tilde{\Sigma}$ are determined. The Eigenvectors with the largest Eigenvalues represent the most important adaptation directions.

After having determined the Eigenvoices, during use of the system, i.e., when a new speech input is received, the adapted Gaussian mixture models are determined via an adapted supervector $\mu^{EV}$. This adapted supervector is a linear combination of the Eigenvoices and the mean vector of the speaker-independent codebook:

$$\mu^{EV} = \tilde{\mu}^0 + \sum_{l=1}^{L} \alpha_l \cdot \tilde{\mu}^l$$

For this linear combination, a predetermined number of the Eigenvoices having the largest Eigenvalues is used. This predetermined number being denoted L in the above equation, for example, L=10.

Alternatively, the adapted mean vector, i.e., the second mean vector, may be written as d-dimensional vector (without the supervector notation) as follows:

$$\mu_i^{EV} = \mu_i^0 + \sum_{l=1}^{L} \alpha_l \cdot \mu_i^l$$

The optimal weights $\alpha_l$ are obtained by inserting this equation into the above equation for the auxiliary function $Q_{EM}$ and optimizing this equation.

In the last step 107, for each of the Gaussian densities in the codebook, the mean vector is set to a convex combination of the first mean vector obtained via the expectation maximization (e.g. maximum likelihood) estimation and the second mean vector obtained via the Eigenvoice adaptation:

$$\mu_i = \alpha_i \cdot \mu_i^{EV} + (1-\alpha_i) \cdot \mu_i^{EM} \quad 0 \leq \alpha_i \leq 1$$

Different, more complicated methods are disclosed in H. Botterweck, *Anisotropic MAP defined by Eigenvoices For Large Vocabulary Continuous Speech Recognition*, Proc. Acoustics, Speech and Signal Processing, ICASSP 2001, R. Stern et al., *Dynamic Speaker Adaptation for Isolated Letter Recognition Using MAP Estimation*, ICASSP 1983 or E. Jon et al., *EMAP-based Speaker Adaptation with Robust Correlation Estimation*, Signal Processing Letter, IEEE, vol. 8, pp. 184-186, 2001.

Instead of determining a maximum likelihood estimate in the expectation maximization process, a maximum a posteriori estimator may be used as well. In general, the computation of $\mu_i^{EM}$ does not significantly increase the required computing resources as this mean vector was already determined when computing $\mu_i^{EV}$.

As optimization criteria, the expectation maximization algorithm using $Q_{MAP}$ given above will be employed to generate a model with maximum a posteriori probability. If one assumes that $\mu_i^{EV}$ was already determined, it may be used as prior knowledge in the equation for $Q_{MAP}$. In other words, in this equation, $\log(p(\Theta))$ will be replaced by $\log(p(\mu_i|\mu_i^{EV}))$.

$\log(p(\mu_i|\mu_i^{EV}))$ models the prior knowledge about the combined or interpolated estimate when the Eigenvoice estimate is given. One may assume that all classes may be combined or interpolated independently from each other to reduce the required computing resources.

For determining $\log(p(\mu_i|\mu_i^{EV}))$, a conditional Gaussian density is taken. This conditional Gaussian density describes the mean translation vector translating the given Eigenvoice estimate to the maximum likelihood estimate. The random variable is the speaker index (which is omitted in the following for better readability). The conditional covariance $\Sigma_{\mu_i|\mu_i^{EV}}$ will be denoted as $E_{v_i}$. Under the assumption of a normal distribution $$\mu_i|\mu_i^{EV} \propto N_i\{\mu_i|\mu_i^{EV}, \Sigma_{v_i}\},$$

one has the following optimization rule:

$$\frac{\partial}{\partial \alpha_i}\left[Q_{EM}(\mu_i, \overline{\Theta}) + \sum_i \log(p(\mu_i | \mu_i^{EV}))\right] = 0.$$

From this, under the assumption of $E\{\mu_i^{EV} - \mu_i^{EM}\} = 0$, the interpolation factor or coefficient of the convex combination $\alpha_i$ is:

$$\alpha_i = \frac{(\mu_i^{EV} - \mu_i^{EM})^T \cdot \sum_{v_i}^{-1} \cdot (\mu_i^{EV} - \mu_i^{EM})}{(\mu_i^{EV} - \mu_i^{EM})^T \cdot \left(n_i \sum_i^{-1} + \sum_{v_i}^{-1}\right) \cdot (\mu_i^{EV} - \mu_i^{EM})}$$

In order to reduce the computation of $\alpha_i$, one may assume that $$\frac{(\mu_i^{EV} - \mu_i^{EM})^T \cdot \sum_{v_i}^{-1} \cdot (\mu_i^{EV} - \mu_i^{EM})}{(\mu_i^{EV} - \mu_i^{EM})^T \cdot \sum_i^{-1} \cdot (\mu_i^{EV} - \mu_i^{EM})} \approx const.$$

which result in the following simplified formula for $\alpha_i$ $$\alpha_i = \frac{const.}{n_i + const.},$$

however, wherein the constants need not be the same.

The new mean vector set in the way as described above has the advantage that, on the one hand, fast adaptation information is taken into account via the Eigenvoice adaptation. On the other hand, a robust estimation is obtained in view of the mean vector of resulting from the expectation maximization process. It is to be noted that MAP and ML converge for large $n_i$, in contrast to the Eigenvoice adaptation. As a consequence, characteristic $\Theta$ features are rapidly taken into account due to the Eigenvoice adaptation and are optimally modeled in the long term due to the expectation maximization process.

In addition to the number $n_i$ of feature vectors (softly) assigned to a Gaussian density or class with index i, the coefficient of $a_i$ of the convex combination may further be a function of a confidence measure. This confidence measure is an indication with respect to the reliability of the adaptation data. After each utterance or speech input, speech recognition is performed for which a confidence value or confidence measure is determined, indicating the reliability of the recognition. Alternatively, such a confidence value may be determined for a feature vector of the speech input (see, for example, see Gollan et al., "Confidence Scores For Acoustic Model Adaptation", ICASSP 2008).

This confidence value may be used as additional weighting when assigning a feature vector to the different classes. The weighting may use the confidence value $0 \leq k(x_t) \leq 1$ (thus, resulting in a soft assignment), or via a threshold criterion. By replacing) $p(i|x_t)$ by $k(x_t) \cdot p(i|x_t)$, the influence of less reliable feature vectors is reduced. The confidence $k(x_t)$ of the feature vector may be reduced, for example, by disturbances or distortions from ambient noise sources.

When performing the feature extraction in step 103, an obtained feature vector may be further processed in this step to reduce distortions and to obtain a corrected feature vector having reduced noise components. This processing also may use conditional Gaussian mixture models. However, it is to be noted that this conditional Gaussian mixture model is an additional model and does not correspond to one of the codebooks of the recognizer or any of the other GMMs described above.

To reduce the distortions, it is the aim to provide a transform to obtain corrected or undistorted feature vectors x from a corresponding distorted feature vector y. A distortion in y may consist of an additive component in the time signal of the speech input signal resulting from background noise. In order to determine such a transform, the conditional Gaussian mixture model is used (see also L. Buera et al., *Cepstral Vector Normalization Based on Stereo Data for Robust Speech Recognition*, IEEE Trans. on Audio, Speech and Langage Processing, vol. 15, no. 3, 2007 and H. J. Song et al., *Eigen.-Environment based Noise Compensation Method for Robust Speech Recognition*, Interspeech, 2005).

In general, a dataset comprising feature vectors x of undistorted utterances with corresponding distorted feature vectors y is used to train a transform from distorted to undistorted feature vectors. The statistical dependencies between undistorted and distorted feature vectors are learned during a training phase. This training phase may take place before any codebook adaptation is performed and/or this training may be performed in parallel during operation of the codebook adaptation method, to replace d a distorted feature vector by an estimate $\hat{x}$ of the corresponding undistorted feature vector during run time. As criterion for the estimate, a minimum mean square error (MMSE) may be used.

Thus, the corresponding conditional Gaussian mixture model has the following form:

$$\hat{x} = \sum_i p(i|y) \cdot E\{x|y, i\}$$

The training data set comprising the feature vectors x and y, as already indicated above, may be obtained in advance. Alternatively or additionally, during use of the codebook adaptation system, distorted speech input and background noise may be acquired so as to train and/or update the transform from distorted to undistorted feature vectors.

As also outlined in European Patent Application no. 08 013 196.4, the estimate $\hat{x}$ may be given as follows:

$$\hat{x} = y + \sum_i^N p(i|y) \cdot (\mu_{x,i} - \mu_{y,i})$$

$$\hat{x} = y + \sum_i^N p(i|y) \cdot r_i$$

Here, $\mu_{x,i}$ and $\mu_{y,i}$ are the mean vectors of the conditional Gaussian densities. The training is performed using the expectation maximization algorithm according to the above equation for $Q_{EM}$. Thus, each single density within such a conditional Gaussian mixture model results in a correction of the distorted vector by a translation in the feature space to compensate for the interference or distortion. For assigning the distorted vector to a particular single density via the corresponding discrete a posteriori $p(i|y)$, a further Gaussian mixture model is used to model the distribution of the distorted feature vector.

$$p(y) = \sum_i^N w_i \cdot N_i\{y|\mu_{y,i}, \Sigma_{y,i}\}$$

The values for $w_i$ and $\mu_{y,i}$ are extracted from the training of the conditional GMM. Thus, the a posteriori probability is given as follows.

$$p(i \mid y) = \frac{w_i \cdot N_i \left\{ y \mid \mu_{y,i}, \sum_{y,i} \right\}}{\sum_{i}^{N} w_i \cdot N_i \left\{ y \mid \mu_{y,i}, \sum_{y,i} \right\}}$$

These above described processes for determining a mean vector (steps 105 and 106) are performed with respect to a particular speaker-dependent codebook. In the following, the process of identifying or selecting a codebook out of a set of codebooks (step 104) will be described in more detail. In principle, identifying or selecting a particular codebook requires identification of the current speaker. This may be performed using the speaker-dependent codebooks present in the set of codebooks. Alternatively or additionally, an external system may be used, (see, for example, European Patent Application No. 07 019 849.4). In principle, these two possibilities may be combined.

It is to be noted that it is not necessary to identify a particular speaker. Alternatively, a speaker clustering may be performed by grouping a set of speakers to which a particular speaker is assigned during use. By adapting the codebook of such a speaker group or speaker cluster, an improvement of the recognition rate of the speech recognizer may be obtained.

For identifying or selecting the codebook, according to an exemplary approach, the dominating classes for the current utterance $X=(x_1, K, x_t, K, X_T)$ are determined for the speaker-independent codebook (standard codebook). The dominating classes are those classes that have a large $n_i$. In other words, those classes from the speaker-independent codebook are selected as dominating classes for which the number $n_i$ of (softly) assigned feature vectors is above a predetermined threshold.

Based on these selected classes of the speaker-independent codebook, the corresponding classes in the speaker-dependent codebooks (corresponding to the dominating classes in the standard codebook) are selected, and a score is determined for each of these classes. The score is the likelihood that a feature vector of an entire utterance or speech input was emitted or created by one or more classes of the codebook. In this way, a first selection of the classes that will be further considered is made. In other words, the likelihood $p(x_t|\Theta)$ given above, i.e. the summation, is reduced to those classes with the largest contribution (see also DE 102 09 324). The resulting score $S_j(x_t)$ with speaker index j is an approximation of $p(x_t|\Theta)$ according to the above equation.

From these scores, an overall score $\overline{S}_j(T)$ for the overall utterance (speech input) is determined for each codebook. As the scores are a likelihood, the likelihood for the utterance can be determined by assuming statistical independence of the scores at different times. Thus, for each time t, a score for each speaker-dependent codebook may be given for the preceding part of the utterance $(x_1, K, x_t)$:

$$\overline{S}_j(t) = \sum_{l=1}^{t} \log(S_j(x_l))$$

Instead of $\overline{S}_j(T)$, a smoothed score may be determined for each codebook via a recursion of first order $$\overline{S}_j(t) = \overline{S}_j(t-1) \cdot \gamma + \overline{S}_j(t) \cdot (1-\gamma) \quad 0 \leq \gamma \leq 1$$

Based on these scores, the best codebook, i.e., the codebook with the optimal or extremal score, is identified or selected each time. This codebook may then also be used for speech recognition. In this way, already during identification of the speaker, an optimal speech recognition is ensured and a suitable assignment of the feature vectors $x_t$ to the classes of the speaker-independent codebook for any subsequent adaptation of the recognized speaker is performed. The final identification of the speaker may be performed after input of the complete utterance or even after a sequence of utterances.

In particular, the iterative computation of $\overline{S}_j(t)$ need not be restricted to a single utterance, but may be performed over a sequence of utterances. In this case, however, the influence of previous utterances onto the current score should be limited to avoid freezing of the score development. This could be achieved by multiplying $\overline{S}_j(t)$ for all j with a positive factor smaller than 1 after each utterance.

The speaker with the optimal or extremal score is recognized as the current speaker. If the standard codebook (speaker-independent codebook) has the best score, a new speaker-dependent model may be created. When using the system the very first time, the set of codebooks may contain only one speaker-independent codebook. In this case, upon receipt of a speech input, a first speaker-dependent codebook will be created by adapting the speaker-independent codebook using the feature vector of the received speech input. After that, the set of codebooks contains at least the speaker-independent codebook and a first speaker-dependent codebook.

If a speaker change has been recognized, preferably, all scores are reset. In addition to identifying new speakers in the above-described way, external sources may be used as well.

Figure 4:
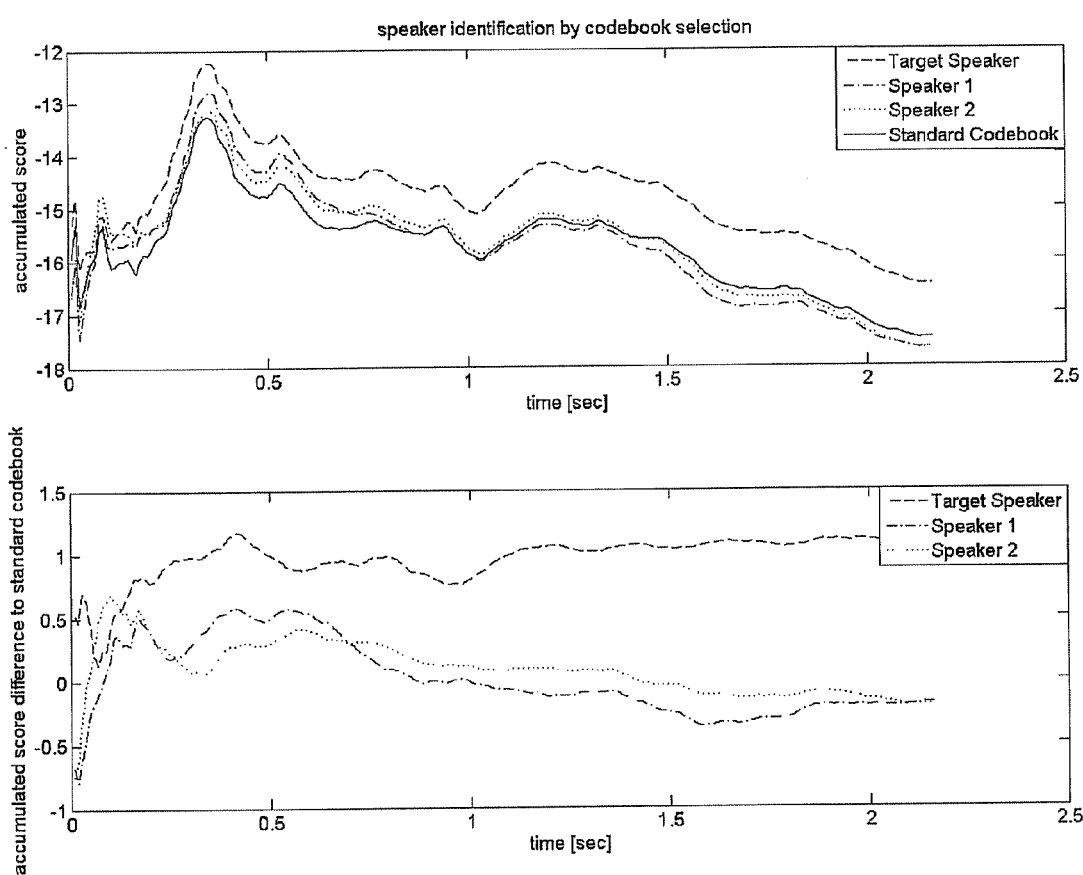
FIG. 4 illustrates the score for an example of codebooks.

In FIG. 4, a score development over time is illustrated for an example wherein the set of codebooks comprises a speaker-independent codebook, i.e. the standard codebook, and three speaker-dependent codebooks. In the upper graph, the cumulative score $\overline{S}_j(t)$ is illustrated, whereas the lower the graph illustrates the difference of the cumulative score for the different speakers and the score of the standard codebook, respectively. As can be seen, the score for the so-called target speaker is extremal, i.e., maximal, so that the target speaker is recognized as the current speaker.

It is to be noted that the above-described method to identify or select a codebook based on the set of speaker-dependent codebooks may also be used independent of the remaining processing steps with regard to adapting the codebook. Instead of basing the identification or selection of the codebook on the extremum, i.e. maximum or minimum, of the accumulated scores, a neural network may be used. As input parameters, additional (soft) decisions from external speaker recognizer may be used in addition to the accumulated scores. Furthermore, the scores of several utterances may be used to perform the decision with respect to a speaker change or a speaker identity in an optimized step. However, in this case, the scores will always be determined for a single utterance.

Furthermore, a Viterbi process may be used. Such a Viterbi process combines a speaker change recognition with speaker identification. For this purpose, a sequence of utterances is being used to determine an optimal path with respect to speaker identity or speaker change via a Viterbi algorithm. Thus, a final decision with regard to a speaker change or a speaker identity is performed after a sequence of utterances.

Using an external speaker change recognizer, a probability for a change between subsequent utterances may be estimated and integrated into a Viterbi algorithm to determine an optimal path with respect to assigning the speaker identities to the utterances (see Schmalenstroeer et al., "Join Speaker Segmentation, Localization and Identification For Streaming Data", Interspeech, 2007). A speaker identification is furthermore known from S. Kwon et al., *Unsupervised Speaker Indexing Using Generic Models*, IEEE Transactions on Speech and Audio Processing, vol. 13, no. 5, 2005.

As an alternative to an external speaker identification, a priori knowledge, for example, an estimated change probability, may be used. In this case, paths with frequent speaker changes are penalized, as these are considered to less probable a priori.

Figure 5:
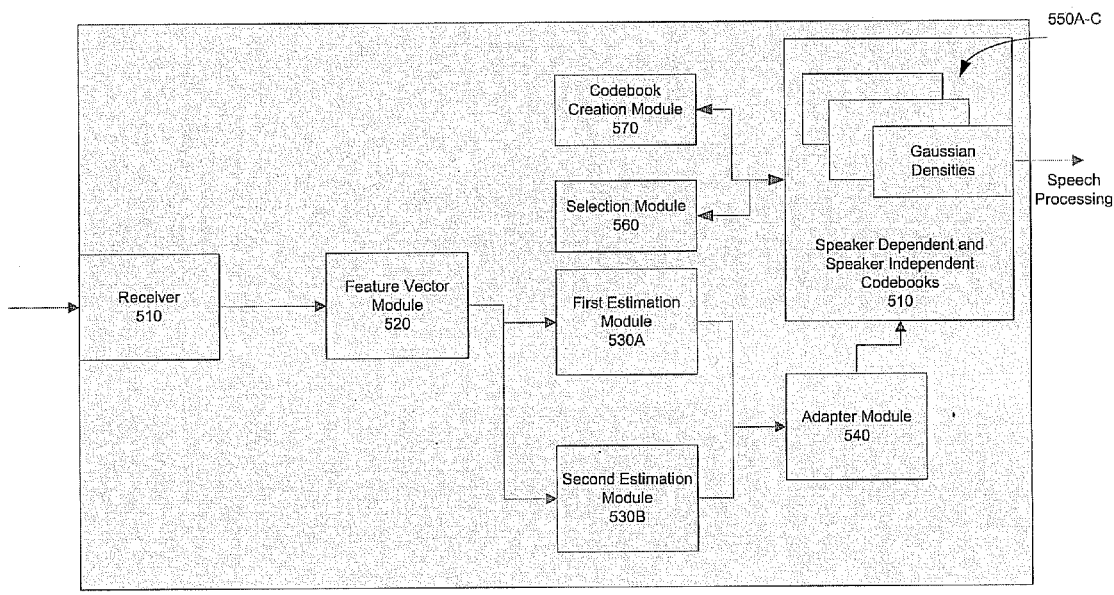
FIG. 5 shows a block diagram of an apparatus for adapting a codebook

FIG. 5 illustrates an apparatus 500 for adapting a codebook for speech recognition, according to the methodology provided above wherein the codebook is from a set of codebooks 510 comprising a speaker-independent codebook and at least one speaker-dependent codebook, each codebook being provided in form of a Gaussian mixture model comprising a set of classes in form of multivariate Gaussian densities, each multivariate Gaussian density being parameterized by a mean vector and covariance matrix. The adaptations for the codebook are determined in response to receiving a speech input at a receiver 520. The receiver takes in the analog audio signal and converts the signal into a digital signal using a digital to analog converter. The signal is divided into frames. The audio frames of the speech signal are provided to a feature vector module 520 for determining a feature vector based on the received speech input. The determined feature vector is provided to an estimation module 530A that estimates for each of the Gaussian densities, a first mean vector using an expectation maximization process and taking into account the determined feature vector. The apparatus also include a second estimation module 530B for estimating for each of the Gaussian densities, a second mean vector using an Eigenvoice adaptation and taking into account the determined feature vector. The output of the two estimation module i.e. the first and second mean vectors is used by an adaptor module 540 for setting, for each of the Gaussian densities 550A . . . C, its mean vector to a convex combination of the first and the second mean vector.

The apparatus may be further configured analogously to the case of the above-described methods. For example, the first estimation module 530A may be configured to estimate the first mean vector using a maximum likelihood linear regression process or a maximum a posteriori process. As another example, the apparatus may comprise a selection module 560 for selecting the codebook from a set of codebooks according to a predetermined criterion. Furthermore, the apparatus may comprise a codebook creation module 570 for creating a new speaker-dependent codebook if the codebook with the highest score is the speaker-independent codebook.

The embodiments of the invention described above are intended to be merely exemplary; numerous variations and modifications will be apparent to those skilled in the art. All such variations and modifications are intended to be within the scope of the present invention as defined in any appended claims.

It should be recognized by one of ordinary skill in the art that the foregoing methodology may be performed in a signal processing system and that the signal processing system may include one or more processors for processing computer code representative of the foregoing described methodology. The computer code may be embodied on a tangible computer readable medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

What is claimed is:

1. A computer-implemented method for adapting a codebook for speech recognition, wherein the codebook is from a set of codebooks comprising a speaker-independent codebook and at least one speaker-dependent codebook, each codebook including a set of Gaussian densities, each Gaussian density being parameterized by a mean vector and a covariance matrix, the computer-implemented method comprising:

(a) receiving a speech input into a processor;

(b) determining a feature vector based on the received speech input;

(c) for each of the Gaussian densities, estimating a first mean vector using an expectation process and taking into account the determined feature vector;

(d) for each of the Gaussian densities, estimating a second mean vector using an Eigenvoice adaptation and taking into account the determined feature vector; and (e) for each of the Gaussian densities, setting its mean vector to a convex combination of the first and the second mean vector, wherein the coefficient of the convex combination is determined individually for each of the Gaussian densities.

2. The method according to claim 1, wherein the expectation process is a maximum likelihood linear regression process or a maximum a posteriori process.

3. The method according, to claim 1, wherein the coefficient of the convex combination
is a function of the number of feature vectors assigned to the respective Gaussian density.

4. The method according to claim 1, further comprising:
performing speech recognition on the feature vector, wherein a confidence measure is determined with respect to the recognized feature vector, and wherein the coefficient of the convex combination is a function of the confidence measure.

5. A method according to claim 1, wherein steps (c) to (e) are preceded by the step of selecting the codebook from a set of codebooks according to a predetermined criterion.

6. A according to claim 5, wherein selecting further comprises:
identifying a speaker corresponding to the speech input and selecting the codebook corresponding to the identified speaker.

7. A method according to claim 5, wherein selecting comprises:
creating a new speaker-dependent codebook if the speaker corresponding to the speech input is not identified or if the set of codebooks does not contain a codebook corresponding to the identified speaker.

8. A method according to claim 5, wherein selecting comprises:
determining a score for assigning a sequence of feature vectors to each of the codebooks, and
selecting the codebook based on the determined scores.

9. A method according to claim 8, wherein determining a score comprises:
selecting the classes from the speaker-independent codebook to which a number of feature vectors above a predetermined threshold is assigned;
selecting the classes from the at least one speaker-dependent codebook that correspond to the selected classes from the speaker-independent codebook, and for each of the codebooks, determining a score based on the selected classes only.

10. A method according to claim 5, further comprising:
creating a new speaker-dependent codebook if the selected codebook based on the determined scores is the speaker-independent codebook.

11. A method according to claim 5, wherein selecting is performed using a Viterbi process.

12. A method according to claim 1, wherein (b) comprises processing the feature vector to reduce distortions to obtain a corrected feature vector.

13. A method according to claim 12, wherein processing is based on a conditional Gaussian Mixture Model obtained via a minimum mean square error estimate.

14. A computer program product including a non-transitory computer-readable medium having computer code thereon for adapting a codebook for speech recognition, wherein the
codebook is from a set of codebooks comprising a speaker-independent codebook and at least one speaker-dependent codebook, each codebook a set of Gaussian densities, the computer code comprising:

(a) computer code for receiving a speech input;

(b) computer code for determining a feature vector based on the received speech input;

(c) computer code, for each of the Gaussian densities, for estimating a first mean vector using an expectation process and taking into account the determined feature vector;

(d) computer code, for each of the Gaussian densities, for estimating a second mean vector using an Eigenvoice adaptation and taking into account the determined feature vector; and (e) computer code, for each of the Gaussian densities, for setting its mean vector to a convex combination of the first and the second mean vector, wherein the coefficient of the convex combination is determined individually for each of the Gaussian densities.

15. The computer program product according to claim 14, wherein the computer code for the expectation process is a maximum likelihood linear regression or a maximum a posteriori process.

16. The computer program product according to claim 14, wherein the coefficient of the convex combination is a function of the number of feature vectors assigned to the respective Gaussian density.

17. The computer program product according to claim 14, further comprising:
computer code for performing speech recognition on the feature vector, wherein a confidence measure is determined with respect to the recognized feature vector, and wherein the coefficient of the convex combination is a function of the confidence measure.

18. A computer program product according to claim 14, wherein the computer code for (c) to (e) are preceded by computer code for selecting the codebook from a set of codebooks according to a predetermined criterion.

19. A computer program product according to claim 18, wherein the computer code for selecting comprises identifying a speaker corresponding to the speech input and selecting the codebook corresponding to the identified speaker.

20. A computer program product according to claim 18, wherein the computer code for selecting comprises creating a new speaker-dependent codebook if the speaker corresponding to the speech input is not identified or if the set of codebooks does not contain a codebook corresponding to the identified speaker.

21. A computer program product according to claim 18, wherein the computer code for selecting comprises:
computer code for determining a score for assigning a sequence of feature vectors to each of the codebooks, and
computer code for selecting the codebook based on the determined scores.

22. A computer program product according to claim 21, wherein the computer code for determining a score comprises:
computer code for selecting the classes from the speaker-independent codebook to which a number of feature vectors above a predetermined threshold is assigned;

computer code for selecting the classes from the at least one speaker-dependent codebook that correspond to the selected classes from the speaker-independent codebook, and computer code, for each of the codebooks, for determining a score based on the selected classes only.

23. A computer program product according to claim 18, further comprising:

computer code for creating a new speaker-dependent codebook if the selected codebook based on the determined scores is the speaker-independent codebook.

24. A computer program product according to claim 18, wherein the computer code for selecting is performed using a Viterbi process.

25. A computer program product according to claim 14, wherein the computer code in (b) comprises computer code for processing the feature vector to reduce distortions to obtain a corrected feature vector.

26. A computer program product according to claim 25, wherein the computer code for processing is based on a conditional Gaussian Mixture Model obtained via a minimum mean square error estimate.

* * * * *